United States Patent [19]

Kuklinski

[11] Patent Number: 4,913,022

[45] Date of Patent: Apr. 3, 1990

[54] CIRCULAR SAW BLADE

[76] Inventor: Anthony K. Kuklinski, 426 Penn Rd., Norristown, Pa. 19401

[21] Appl. No.: 283,720

[22] Filed: Dec. 13, 1988

Related U.S. Application Data

[63] Continuation-in-part of Ser. No. 196,811, May 19, 1988, Pat. No. 4,802,396.

[51] Int. Cl.⁴ ............................................. B27B 33/08
[52] U.S. Cl. ........................................ 83/849; 83/835; 83/850; 83/851
[58] Field of Search ................. 83/835, 837, 851, 850, 83/848, 849

[56] References Cited

U.S. PATENT DOCUMENTS

| 105,469 | 7/1870 | Marble | 83/851 |
| 211,346 | 1/1879 | Robbins et al. | 83/849 |
| 1,381,930 | 6/1921 | Morgan | 83/851 |
| 1,494,576 | 5/1924 | Biedermann et al. | 83/851 |

Primary Examiner—Donald R. Schran
Attorney, Agent, or Firm—Eugene Chovanes

[57] ABSTRACT

A circular saw blade having shearing teeth and cleaving teeth in combination wherein the shearing teeth alternatively cut the fiber on opposite sides of the kerf, and the cleaving teeth separate out the sheared fiber. The saw cuts in either rotational direction.

1 Claim, 3 Drawing Sheets

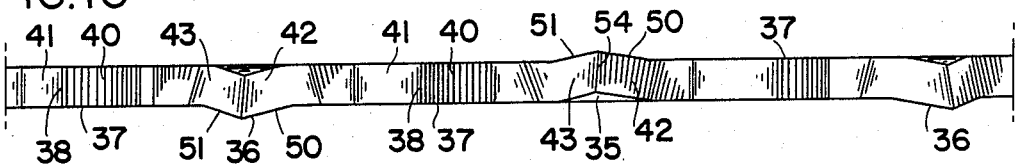
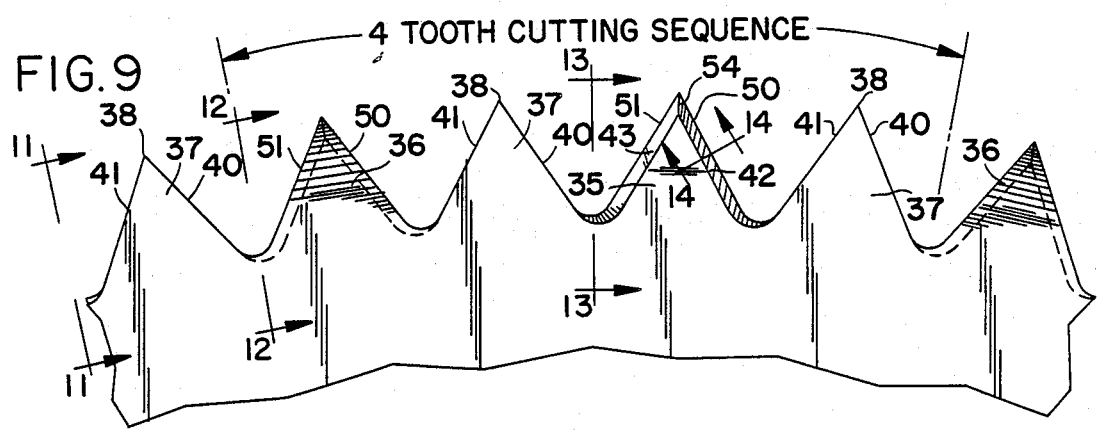
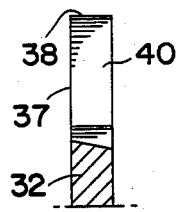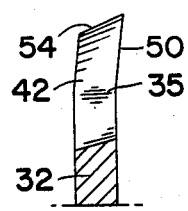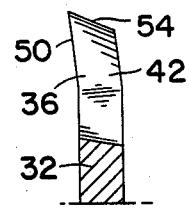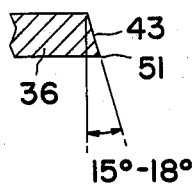
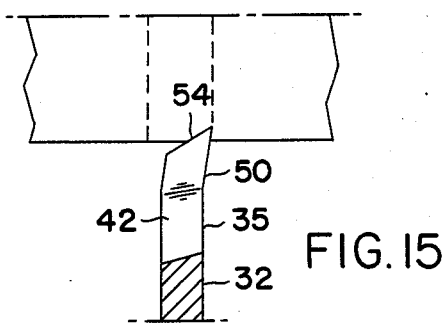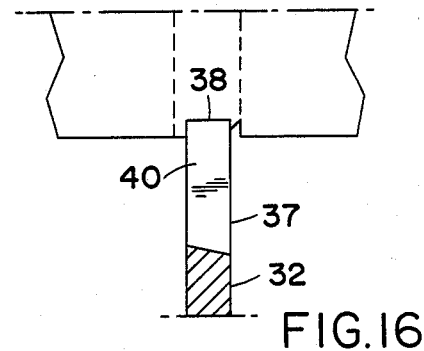
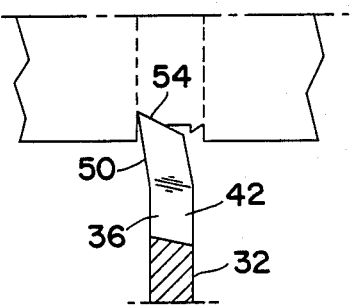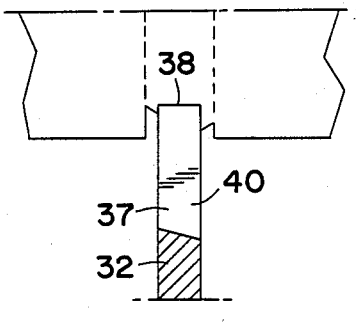

CIRCULAR SAW BLADE

This application is a continuation-in-part of pending application Ser. No. 196,811 filed May 19, 1988 for SABER SAW BLADE now U.S. Pat. No. 4,802,396 issued Feb. 7, 1989.

BACKGROUND OF THE INVENTION

1. Field of the Invention:

The field of invention relates to circular power saws, and more particularly, circular blades for such saws. Specifically, the invention is direct to the teeth on such circular blades.

Circular power saws include portable, motor-driven circular power saws, bench saws (often referred to as "table saws" or "circular saws"), and radial-arm saws. Such saws are used to cross cut, rip cut, and cut on a diagonal. Additionally, in bench saws, for instance, bevel cuts can be made when the blade is tilted.

Operation and use of such circular power saws are well known.

The blades of such saws are circular disks having blades of for instance from 4½" in diameter for, for instance, portable trim saw blades to 7½ to 10" in blade diameter for bench saws and radial saws. In some instances, radial arm saw blades may extend to 12" to 14" and beyond. The driving shafts, or arbors of the saw rotate in the same direction at all times when the saw is turned on, and the saw blades are designed to cut in one direction only, so that the saw blade must absolutely be mounted to rotate in the right direction. Extreme care must be taken to insure that the blade is affixed to the rotating shaft of the saw so that the blade rotates in the proper direction.

2. Description of the Prior Art

Prior art circular saw blades have teeth which are of hook shape inclined toward the direction of rotation. The teeth are set in the well known fashion to provide a kerf which yields ample clearance to prevent binding. The teeth are generally in the form of the conventional crosscut type of tooth, which, although not completely efficient in a ripping action, nevertheless performs adequately for its intended purpose.

A problem with the prior art circular power saw blade is that it cuts only in one direction of rotation of the blade. If the blade is attached to the saw with the teeth projecting in the wrong direction, a cut is not possible since there is a burning effect. Hence, when the saw becomes dull from cutting in its intended direction, it cannot be used by reversing the blade to achieve a continued life.

Additionally, a blade mounted to rotate in the wrong direction can present a safety hazard since the saw can bind, or jam, and then jump under the motor driving force.

In summary, the prior art power circular saw blade is only usable when rotated in one direction, and is ineffective and unusable, and even unsafe, when rotated in the opposite direction.

Some circular power saw blades are specially hardened to give relatively long life, but cannot be resharpened in a conventional fashion. Relatively low cost blades, however, makes disposal practical. Others can be resharpened with a file, on a job location, by a mechanic knowledgeable in the art.

SUMMARY OF THE PRESENT INVENTION

With the circular power saw blade of the present invention, equally effective cutting can be obtained by rotating the saw blade in either direction. Hence, the life of a saw blade is in effect increased substantially since, after it becomes dull in one direction, it can be reversed within the saw, and a continued cutting life obtained in the opposite rotational direction.

The saw blade of the present invention has teeth which are symmetrical and equally effective in cutting in either direction. When the teeth become dull from rotation in one direction, there is no dulling of the teeth with respect to their use in cutting when rotated in the opposite direction.

Additionally, the teeth are of such a nature, and comprise such a cycle, that even if one set of the teeth become dull, they perform equally well since they are not really engaged in a cutting function, but are involved in a cleaving function which is a modified chiseling action that does not depend entirely on a sharp edge.

Since the blade cuts in both rotational directions, no safety hazard can be created by improper mounting.

The benefits of the present invention result from the particular teeth design on the saw blade.

The present blade has a combination of teeth which includes shearing teeth of a certain design, and cleaving teeth of a certain design. The shearing teeth have a set with respect to the body of the blade, whereas the cleaving teeth lie in the plane of the blade, and have no set. The shearing teeth and cleaving teeth work in combination and sequentially, wherein the shearing teeth shear cut the wood fibers alternatively at the side of the kerf and cleaving teeth split, separate, and remove the sheared fiber.

The teeth of the blade are equally effective in the direction of the grain, as well as across the grain, as well as at any angle with respect to the grain. The teeth work particularly well in plywood or laminates wherein the wood is laminated to provide alternative layers of opposing grains so that the blade is simultaneously cutting with and against the grain, with equal effectiveness.

Additionally, in the present invention the cutting sequence is spread over more teeth than in the prior art cutting sequence. A cutting sequence is defined as a number of teeth necessary in combination to create a cut. Hence, there is less tendency for the saw to lift or jump. A specific shearing action occurs on one side of the kerf from one shearing tooth after which an adjacent cleaving tooth cleaves the wood fibers in the kerf adjacent to the shearing cut in the kerf, after which the fiber is sheared on the opposite side of the first shear by an adjacent shearing tooth.

Cleaving action is best defined as separating by splitting. Considering that wood is comprised of hollow parallel grouped tubular fibers, the cleaving tooth splits these fibers from one another, or from themselves, both when the circular saw is sawing with the grain of the wood, or across the grain. A shearing tooth shear cuts the fibers on one side of the kerf before the cleaving action, and a shearing tooth cuts the fibers on the opposite side of the kerf after the cleavage action. The cleavage action takes place entirely across the width of the cleaving tooth which is of the same width as the body of the saw itself. The cleaving teeth have no set, whereas the shearing teeth do have alternative, opposing sets.

The shearing teeth and cleaving teeth are symmetrical with respect to both possible directions of rotation of the circular saw blade; that is, the same teeth design applies on both a given rotational direction, or an opposite rotational direction, and the same sawing action occurs in both directions. Of course, the blade is also symmetrical with respect to the center plane parallel to the flat side faces, so that the saw blade tooth direction can be reversed in the saw by simply flopping the blade over and mounting it on the saw arbor with the side faces reversed. Since the saw blade can be used in this manner, there is no danger of mounting the blade so that it rotates in the wrong direction, thus creating a safety hazard from kick-back or the like.

The shearing action consists of a directed cutting stroke against the fibers at a fixed angle. The shearing action at the fixed angle provides a most efficient severance of the fiber at the side of the kerf, since the movement is such that rather than a vertical cut at the side of the kerf resulting from the vertical movement of the tooth, the tooth is such that it imparts an angle or shearing cut to the side. This is analogous to for instance a knife cut on a loaf of bread wherein you have movement of the blade at an angle rather than in a completely downward stroke. In this respect, this shearing action is different from the tearing action of a point on the well known prior art crosscut tooth.

The cleavage action is in the form of a modified chiseling action which by virtue of the shape of the cleaving tooth, provides such modified chiseling effect in either rotational direction. Similarly, of course, the shearing teeth are of a form which provides equal shearing action in either rotational direction.

The shearing teeth and cleaving teeth are of equal height.

BRIEF DESCRIPTION OF THE DRAWINGS

FIG. 1 is a side elevational view of a typical circular saw blade of the prior art.

FIG. 2 is an enlarged fragmentary side elevational view of the portion of the circular saw blade of FIG. 1 bordered by the dot-and-dash box and labeled "FIG. 2".

FIG. 3 is plan view of FIG. 2 showing further details of the tooth design.

FIG. 4 is an enlarged transverse sectional view taken on the line 4—4 of FIG. 2.

FIGS. 5 through 8 are views of the present invention corresponding to FIGS. 1 through 4 of the prior art described above.

FIG. 5 is a side elevational view of the circular saw blade of the invention.

FIG. 6 is an enlarged fragmentary side elevational view of the portion of FIG. 6 enclosed by the dot-and-dash box and labeled "FIG. 6", showing in detail the tooth design and sequence.

FIG. 7 is an enlarged fragmentary plan view of FIG. 6, showing additional details of tooth design.

FIG. 8 is an enlarged transverse sectional view taken on the line 8—8 of FIG. 6, showing further details of tooth design and the tapering of the blade body.

FIG. 9 is a greatly enlarged fragmentary side elevational view of the circular saw teeth, showing the design and sequence of the tooth design incorporated in the invention.

FIG. 10 is a plan view of FIG. 9.

FIGS. 11 through 14 are sectional views taken on the lines 11—11, 12—12, 13—13, and 14—14 respectively, of FIG. 9.

FIGS. 15 through 18 are schematic sequential views showing the cutting action of each tooth in sequence and relative depth of cut during a four-tooth sawing cycle.

DESCRIPTION OF THE PREFERRED EMBODIMENT

Prior Art

Figure 1:
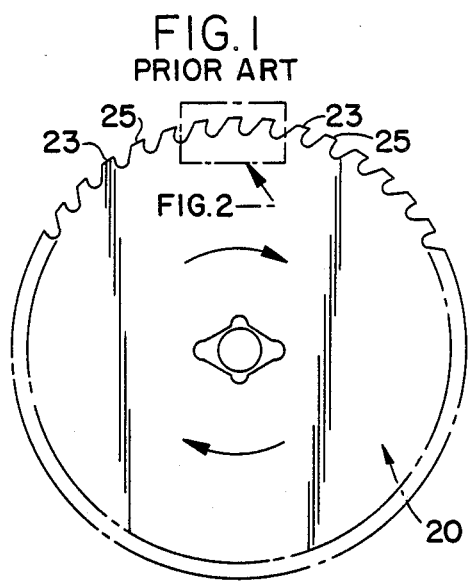
FIG. 1 through 5 refer to the prior art.
Figure 5:
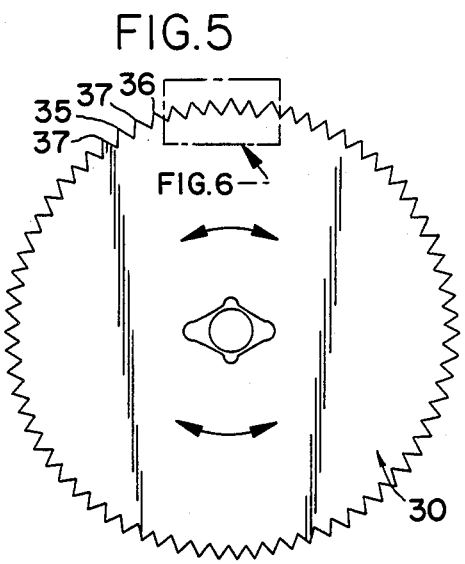
Figure 3:
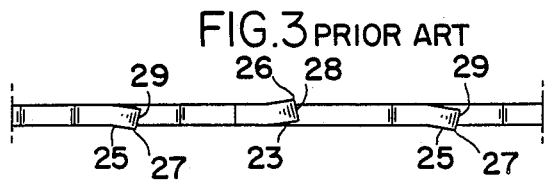
Figure 7:
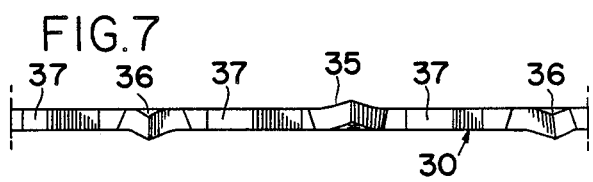
Figure 2:
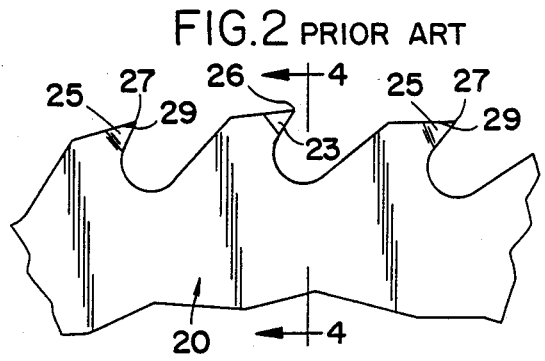
Figure 19:
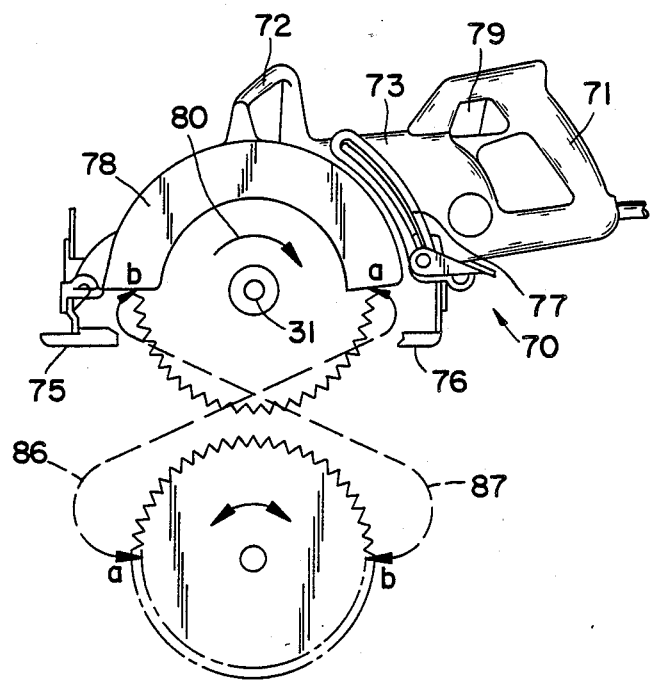
FIG. 19 is a schematic view of a circular saw employing the saw blade of the invention, and showing how the blade can be mounted in a saw.

Referring to FIGS. 1 through 4, there is shown a prior art circular saw blade 20 with a blade body 22. Blade body 22 is a flat disk form which has extending through its center, as is well known, an arbor opening 21 which is mounted one, for instance, a portable circular saw 70 as seen in FIG. 19. The blade diameter varies normally from, for instance, 4½" to 10" or larger, and has thereon at its perimeter 11 wood cutting hooked teeth 12 in the amount of, for instance, from 6 to 10 teeth per inch. The teeth 23 and 25 are set with respect to blade body 22 alternatively along the length of the saw. The cutting cycle consists of two teeth 23 and 25 which are essentially crosscut teeth which are filed as at 24 for combination cutting either in the direction of the grain or across the grain of the wood fibers. The crosscut teeth are angled, as best seen in FIG. 2, in what is in effect a hook type of configuration 14 so that, as seen in FIG. 2, cutting takes place when the blade rotates in the direction 15 shown in FIG. 1 by means of the hooked teeth 12 which in effect tear out the fibers on a crosscut or a rip cut. Picturing the fibers as a bundle of parallel stands of hollow rope, the prior art circular saw blade 20 actually grasps a fiber or fibers and pulls or breaks them away from the bundle to create the kerf. The teeth 23 and 25 have points 26 and 27 respectively, which are the tearing portions of the tooth.

Referring to the drawings, there is shown in FIGS. 5 through 8 inclusive, views of the saw blade of the present invention corresponding to FIGS. 1 through 4 of the prior art.

A circular saw blade 30 has a body 32. The body 32 of the blade of the invention can be of the same size and dimension as the prior art. An arbor opening 31 extends through the center of the disk, and teeth 34 extend around the periphery of the disk as in the prior art. The primary invention lies in the teeth configuration as will be described.

With reference to the teeth 34 of FIGS. 5 through 8, shearing teeth 35 and 36 have between them cleaving teeth 37. Shearing teeth 35 and 36 are identical except they are set in opposition to one another. Shearing teeth 35 and 36 are set with respect to the blade body 32 in the conventional prior art relationship in terms of the number of teeth per inch. In the teeth of the blade of the invention, a suitable setting would be a number 5 set on a standard saw set mechanism. A 5 setting on a standard hand set device, for hand saws, is well known, and is that setting normally used for a crosscut hand saw having 5 points, or teeth, per inch, which yields an angle B as seen in FIG. 12 of approximately 5° to 7½°. The function of set, as is well known, is that the saw will cut a path or kerf in the wood slightly wider than the thickness of the saw blade, to provide clearance. Normally, this should give the blade of the saw a clearance of about 1/100 of an inch.

A suitable tooth density may be 6 teeth to the inch, or points to the inch, although this may vary; for instance, from 4 teeth per inch to 10 teeth per inch, more or less. The choice is dependent on the wood material being cut and is a matter of choice to the operator. Generally speaking, the harder the material and/or the smoother cut desired, the more teeth per inch. A coarser cut results from the lesser number of teeth, but the cutting action is faster. In determining the teeth per inch, both the cleaving teeth as well as the shearing teeth are included.

Figure 6:
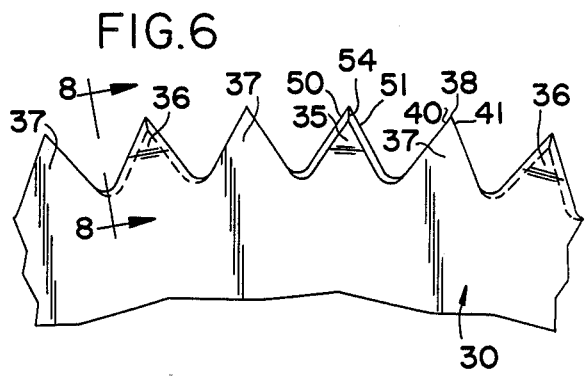
Figure 4:
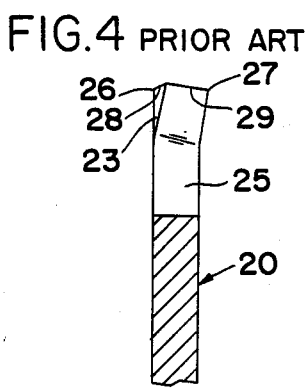
Figure 8:
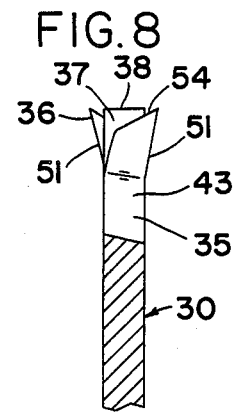

As seen for instance in FIG. 6, the distance 39 between the center lines of the cleaving teeth 37 and the shearing teeth 35 and 36 is equal. The topmost portions of each of the teeth 35, 36 and 37 are equal in height so that the teeth at the top are all at the same circular circumference of the disk with respect to one another. The cleaving teeth 37 as seen in FIGS. 6 and 9 form a symmetrical angle of 60° with respect to the apex edge 38. The cleaving teeth 37 are left erect, with no set, so they remain in the plane of the saw body 32. The cleaving teeth 37 are filed perpendicular to the plane of the body of the blade, at an angle of 90°. There results a symmetrical tooth having opposing sloping sides 40 and 41 disposed in a plane perpendicular to the plane of the blade body.

Reference is made particularly to FIGS. 10 through 13 to describe the shape of shearing teeth. The shape of the shearing teeth 35 and 36 will be described by reference to the filling of the teeth, by hand, with a small triangular file. Of course, it should be understood that any other manufacturing method for achieving the shape shown and described can be used.

In filling the shear tooth, the shear tooth 35 or 36 first takes initially the form of the cleaving tooth 37 described above. In other words, a blade can e formed by first repetitively forming identical cleaving teeth 37. Selected teeth are then set to begin forming shearing teeth 35 and 36. A first initially formed tooth is set to one side of the blade body 32, and then the next tooth is left remaining as a cleaving tooth 37, and then the next initially formed tooth is set opposite the first set tooth to begin forming the second shearing tooth in the cycle. The next initially formed formed tooth is left to remain as a cleaving tooth 37 to complete the four-tooth cycle.

A small triangular file is then drawn across surface 42 of tooth 35 to form the surface. The file is drawn across the surface at an inclined angle of approximately 15° to 18°, as shown in FIG. 14 of the drawings.

The file is also positioned to form an included horizontal angle of approximately 60° with the blade body when the blade body is being so held vertically. The net result is that the file moves at an oblique angle on the vertically positioned saw body 32 up and to the left with reference to the blade 30, as seen in FIG. 9. Similarly, surface 43 of tooth 35 is formed with the file being inclined at an angle of 15° to the horizontal and at included horizontal angle of approximately 60° with respect to the vertically disposed blade body 32 when positioned as shown in FIG. 11.

It should be clearly understood that although the constructions of a saw blade of the present invention is described in terms of manually filling so that the angle relationships can be more clearly understood, any prior art process, such as stamping, die-cutting, grinding or the like can be used to form the blade. In fact, it is intended that the blade of the invention be generally mass produced by such methods.

Shear edges 50 and 51 are formed on the shearing tooth 35, on the edges of the surfaces 42 and 43.

With respect to shearing tooth 36, the same procedure is followed as tooth 35, but from the opposite side of the saw blade.

The shearing teeth 35 and 36 then take the form as shown in the drawings in FIGS. 10 through 13.

As seen in FIG. 13, the resulting edge 54 forms an angle of A of approximately 20° to 30° with the horizontal.

Shear edges 50 and 51 form an angle of approximately 30° with vertical or, put another way, the edges 50 and 51 form an included angle of approximately 60° symmetrically about a vertical, as seen in FIG. 9.

It should be understood that the purpose of filling or shaping the shearing tooth in the manner described is to obtain the shear edges 50, and 51, since these are the edges that cut the wood fibers while the edge travels forward at an incline, much as a knife edge travels through a loaf of bread at an angle when a knife is used to cut the bread in a sawing action.

While reference is made to an edge, it is the line formed by the meeting of two planes. The word is used in the sense that it is describing the line formed by the meeting of two planes, and not in the sense of for instance a plane such as the edge plane of a door.

The cutting edges 50 and 51 respectively are lines formed by the meeting of the adjacent planes.

In actual operation, it will be seen that only the immediate edge adjacent to the apex of the tooth is involved in the actual shearing operation and in some instances would be for instance 1/16" and would range to a deeper shear in soft woods and a more shallow shear in hard woods.

In operation, the teeth act in sequence. Two shearing teeth 35 and 36, oppositely set, and two cleaving teeth 37 act in combination, sequentially, to perform a kerf cut. For purposes of illustration only, the operation can be pictured as the shearing tooth first traveling for the length of the stroke to cut, by inclined shear means, a line into the wood along one side of the kerf much as an inclined sharp pocket knife run along a piece of wood would form a line cut, into the fiber. The wood is being cut by an inclined sharp surface; namely, shear edge 50 near the apex of the tooth whereby the fibers of the wood either longitudinally or transversely or obliquely, are either severed or separated. This is seen in FIG. 15. By virtue of this cutting through a shearing action, very little if any fiber is removed. As shearing tooth 35 moves through for this cutting effect with shearing action, there is virtually no resistance to movement through the wood since the tooth action is a sharp, shearing effect to cut or separate the fibers, as opposed for instance to the prior art teeth described above which is actually tearing and removing fiber simultaneously and thus creating substantial resistance to the blade movement.

To further describe the saw blade action and teeth action in a given sequence, the reference is made to the subsequent movement of a cleaving tooth through the kerf as shown in FIG. 16. The cleaving tooth 37 in its movement in FIG. 16 results in a removal of the fibers from its position with respect to the center of the kerf, in the center of the kerf, particularly separating and rendering free the fibers from the wood at substantially all points except at the edge of the kerf opposite the cut of FIG. 15.

The cleaving tooth action is in the form of a modified chisel effect since the surface 41 or 42 of cleaving tooth 37 is at an angle other than perpendicular with respect to its movement through the kerf, as opposed to, for instance, the prior art rip tooth, which is a full chiseling effect, since its tooth face is at a right angle to the movement of the saw blade.

This modified chisel effect provides a gentle separation of the fibers by means of a cleaving effect which damages the fibers and separates them but does not tear in its action. Again, such modified chiseling, or cleaving action, results in less resistance to blade movement.

As seen in FIG. 17, a shearing tooth 36 then moves through the kerf at the side opposite the cut of FIG. 15 wherein the separated fibers caused by the teeth action of FIGS. 15 and 16 are cut by shearing action and dropped out of the kerf. Simultaneously the tooth also begins a new cut which is the equivalent of the cut referred to in FIG. 15. The effect is that the prior disturbed fibers are cut and removed and new fibers which have hitherto been intact are now cut.

In FIG. 18, the cleaving tooth 37 moves forward with the same action and performs essentially the same function as in FIG. 16.

Although the actions have been described individually above, it is understood that the teeth being placed one adjacent another perform the several functions virtually simultaneously but, nevertheless, sequentially. The total effect is a clean, gentle, efficient action which results in a kerf which is relatively smooth since no tearing takes place.

The present saw blade relies much more on efficiency and delicateness of fiber removal than does the rash tearing of the prior art.

FIG. 19 illustrates a portable circular saw 70 having handles 71 and 72, a motor 73, shoes 75 and 76, adjustment 77, guard 78, and trigger on/off switch 79.

Arrow 80 shows the fixed direction of rotation of the saw arbor 81 under the driving power of motor 73. The blade of the invention 82 will operate, as described above, if rotated in either direction as shown at 83.

A blade 85 can be simply removed from arbor 81 and then turned over as seen illustrated by arrows 86 and 87, so that fixed points a and b are repositioned, and the blade remounted on the arbor. The repositioning of the blade in the saw results in the blade being rotated in the reverse direction even though the saw arbor is continuing to rotate as at 80.

I claim:
1. For cutting a kerf in wood composed of fibers, a circular saw metal blade capable of selectively rotating in opposite angular directions, in the form of a circular disk having a center mounting opening, and teeth extending generally in the plane of the disk outwardly from the center and continuously along the perimeter of the disk, the improvement comprising:
   a tooth combination of
      (1) first and second shear teeth for shearing fibers at the side of the kerf, and
      (2) cleaving teeth for partially cleaving fibers cut on one side of the kerf,
   wherein
      (1) a single cleaving tooth alternates with a single shear tooth so that there is a first and second shear tooth adjacent each cleaving tooth;
      (2) the shear teeth
         (a) are beveled to shear edges which intersect to form a point, and
         (b) have a set out of the plane of the disk, with the first shear tooth adjacent each cleaving tooth having an opposite set from the second shear tooth;
      (3) the cleaving teeth lie in the plane of the disk; and
      (4) the individual teeth when viewed in a direction normal to the plane of the disk are in the form of an isosceles triangle and are symmetrical about a line normal to the base of the triangle from its apex, so that the same sawing action occurs with respect to both possible angular directions of rotation of the blade;
   whereby, when the saw blade rotates in either angular direction, a sawing action occurs,
      wherein
         (1) the shear edge on the side of the first shear tooth in the direction of travel first cuts wood fibers at the side of the kerf of the set;
         (2) the cleaving tooth adjacent the first shear tooth partially cleaves the said first cut fibers from the wood, the said cut fibers remaining intact at the side of the kerf opposite the cut made by the first shear tooth, and
         (3) the shear edge on the side of the second shear tooth in the direction of travel cuts the said partially cleaved fibers at the side of the kerf opposite the first cut.

* * * * *